(12) United States Patent
Liao et al.

(10) Patent No.: US 8,922,706 B2
(45) Date of Patent: Dec. 30, 2014

(54) IMAGE SYSTEM AND DENOISING METHOD THEREFOR

(75) Inventors: Chi Chieh Liao, Hsin-Chu (TW); Hsin Chi Cheng, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 174 days.

(21) Appl. No.: 13/614,940

(22) Filed: Sep. 13, 2012

(65) Prior Publication Data

US 2013/0093921 A1 Apr. 18, 2013

(30) Foreign Application Priority Data

Oct. 18, 2011 (TW) .............................. 100137655 A

(51) Int. Cl.
| | |
|---|---|
| *H04N 9/64* | (2006.01) |
| *H04N 5/217* | (2011.01) |
| *H04N 9/73* | (2006.01) |
| *G06F 3/041* | (2006.01) |
| *H04N 5/235* | (2006.01) |
| *G06F 3/042* | (2006.01) |

(52) U.S. Cl.
CPC ............ *G06F 3/0418* (2013.01); *H04N 5/2357* (2013.01); *G06F 3/0421* (2013.01)
USPC .......................... 348/351; 348/241; 348/226.1

(58) Field of Classification Search
USPC ....................................... 348/251, 241, 226.1
See application file for complete search history.

(56) References Cited

U.S. PATENT DOCUMENTS

| | | | |
|---|---|---|---|
| 7,583,297 B2 * | 9/2009 | Yamada | 348/224.1 |
| 2005/0238259 A1 | 10/2005 | Kim et al. | |
| 2010/0141791 A1 * | 6/2010 | Fujiwara et al. | 348/226.1 |

* cited by examiner

*Primary Examiner* — James Hannett
(74) *Attorney, Agent, or Firm* — Lowe Hauptman & Ham, LLP

(57) ABSTRACT

There is provided an image system including at least one image sensor, a light source and a processing unit. The at least one image sensor sequentially acquires at least two images within each of the brightness variation intervals of an ambient light source. The light source lights once within each of the brightness variation intervals and the lighting of the light source is synchronized to one of the images acquired by the at least one image sensor. The processing unit calculates an image difference between the image synchronizing to the lighting of the light source and the image not synchronizing to the lighting of the light source thereby eliminating interference from the ambient light source. There is further provided a denoising method for an image system.

13 Claims, 4 Drawing Sheets

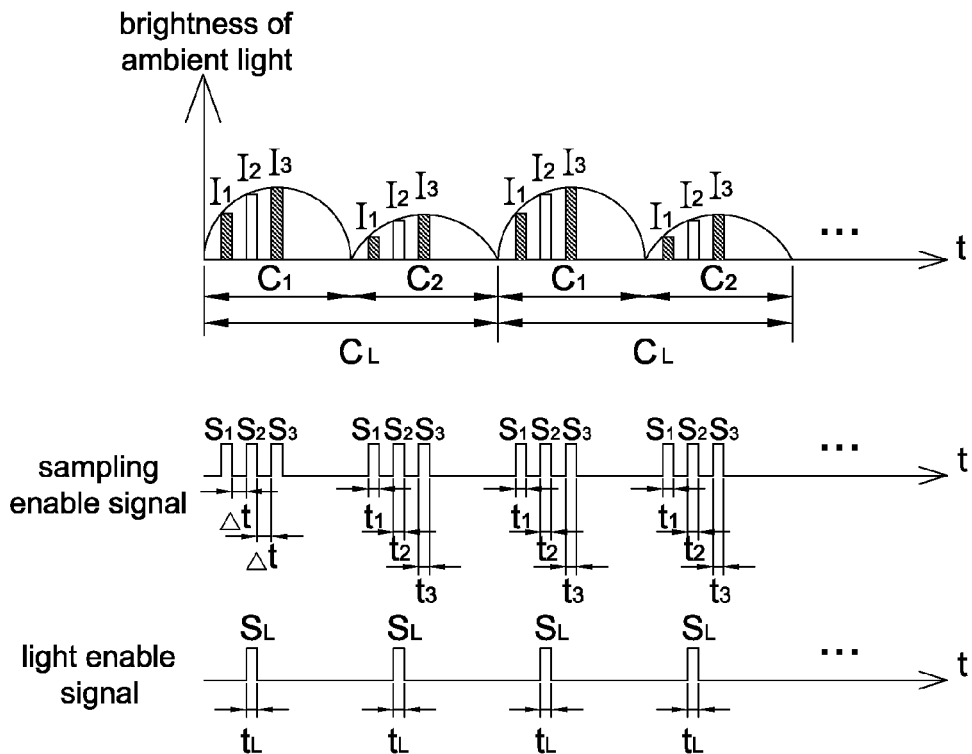

IMAGE SYSTEM AND DENOISING METHOD THEREFOR

CROSS REFERENCE TO RELATED APPLICATION

This application claims the priority benefit of Taiwan Patent Application Serial Number 100137655, filed on Oct. 18, 2011, the full disclosure of which is incorporated herein by reference.

BACKGROUND

1. Field of the Disclosure

This disclosure generally relates to an image system and denoising method therefor and, more particularly, to an image system and a denoising method capable of eliminating the flicker caused by ambient light sources.

2. Description of the Related Art

In the present day, the image acquisition technology has been widely applied to various electronic products such as optical touch systems, distance measuring systems, optical finger mouse systems or other optical applications capable of performing corresponding controls according to acquired images.

Generally, said optical applications utilize at least one image sensor to acquire images and a processing unit to post-process the acquired images so as to calculate the variation of image content. However, since the image sensor is configured to detect the energy variation, images acquired by an image sensor can directed be interfered when the brightness of ambient light sources changes with time such that the operation accuracy of the system can be degraded.

Especially when the brightness of ambient light sources does not change with a simple brightness variation or ambient light sources having different brightness variations are simultaneously exist in the environment, the interference from the ambient light sources is difficult to be removed such that the operation accuracy of an image system is unable to be effectively improved.

Accordingly, the present disclosure provides an image system and a denoising method that can eliminate or at least significantly reduce the flicker caused by complicated brightness variations of ambient light sources.

SUMMARY

It is an object of the present disclosure to provide an image system and denoising method therefor capable of effectively eliminating the flicker in an image system caused by complicated brightness variations of ambient light.

The image system of the present disclosure includes at least one image sensor and a light source, and operates under an ambient light which has a brightness value varying with identical or different brightness variation intervals, wherein said brightness variation intervals may have regular or irregular brightness variations depending on the combination of ambient light sources.

The present disclosure provides a denoising method for an image system including the steps of: using the image sensor to sequentially acquire a first image and a second image within each of the brightness variation intervals; lighting the light source once within each of the brightness variation intervals, wherein the lighting of the light source is synchronized to one of the first image and the second image; and subtracting the second image or the first image not synchronized to the lighting of the light source from the first image or the second image synchronized to the lighting of the light source thereby eliminating interference from the ambient light.

The present disclosure further provides a denoising method for an image system including the steps of: using the image sensor to sequentially acquire an odd number of at least three images within each of the brightness variation intervals; lighting the light source once within each of the brightness variation intervals, wherein the lighting of the light source is synchronized to a middle image of the odd number of at least three images; and subtracting a sum or an average of the other images not synchronized to the lighting of the light source from the middle image synchronized to the lighting of the light source thereby eliminating interference from the ambient light.

The present disclosure further provides an image system including at least one image sensor, a light source and a processing unit. The at least one image sensor is configured to sequentially acquire two images or an odd number of at least three images within each of the brightness variation intervals. The light source is configured to light once within each of the brightness variation intervals, wherein the lighting of the light source is synchronized to one of the images acquired by the image sensor. The processing unit is configured to subtract the image not synchronized to the lighting of the light source from the image synchronized to the lighting of the light source, or to subtract a sum or an average of the images not synchronized to the lighting of the light source from the image synchronized to the lighting of the light source thereby eliminating interference from the ambient light.

The present disclosure further provides an image system including a light source, an image sensor and a processing unit. The light source is turned on at a predetermined frequency. The image sensor is configured to sequentially acquire a first image when the light source is turned off, a second image when the light source is turned on and a third image when the light source is turned off again. The processing unit is configured to subtract a sum or an average of the first image and the third image from the second image.

The present disclosure further provides an image system including a light source, an image sensor and a processing unit. The light source is turned on at a predetermined frequency. The image sensor is configured to acquire a first image with a first exposure time when the light source is turned off and to acquire a second image with a second exposure time when the light source is turned on, wherein the first exposure time is different from the second exposure time. The processing unit is configured to obtain an object information according to the first image and the second image, wherein the object information is an image information of an object in contact with or hovering upon a touch surface.

In the image system and denoising method of the present disclosure, exposure times or enable intervals for acquiring images may be identical or different; preferably, a time interval between images that are used to calculate the image difference should be designed as short as possible.

In the image system and denoising method of the present disclosure, each of the brightness variation intervals may be ($\frac{1}{100}$) second, ($\frac{1}{120}$) second or determined according to the power system coupled to the ambient light source. The lighting frequency of the light source may be 100 Hz, 120 Hz or determined according to the power system coupled thereto.

The image system and denoising method of the present disclosure may also be applied to the operation under the ambient light having a fixed brightness variation.

BRIEF DESCRIPTION OF THE DRAWINGS

Other objects, advantages, and novel features of the present disclosure will become more apparent from the following detailed description when taken in conjunction with the accompanying drawings.

FIG. 7 shows a schematic diagram of the denoising method for an image system according to the second embodiment of the present disclosure.

FIG. 8 shows a flow chart of the denoising method for an image system according to the second embodiment of the present disclosure.

DETAILED DESCRIPTION OF THE EMBODIMENT

It should be noted that, wherever possible, the same reference numbers will be used throughout the drawings to refer to the same or like parts.

The present disclosure is related to an image system and a denoising method configured to eliminate interference from external ambient light sources. The ambient light sources have different brightness variation intervals within each brightness variation cycle, and the different brightness variation intervals may be caused by a single ambient light source or by different types of ambient light sources to have a regular or an irregular variation.

Figure 1:
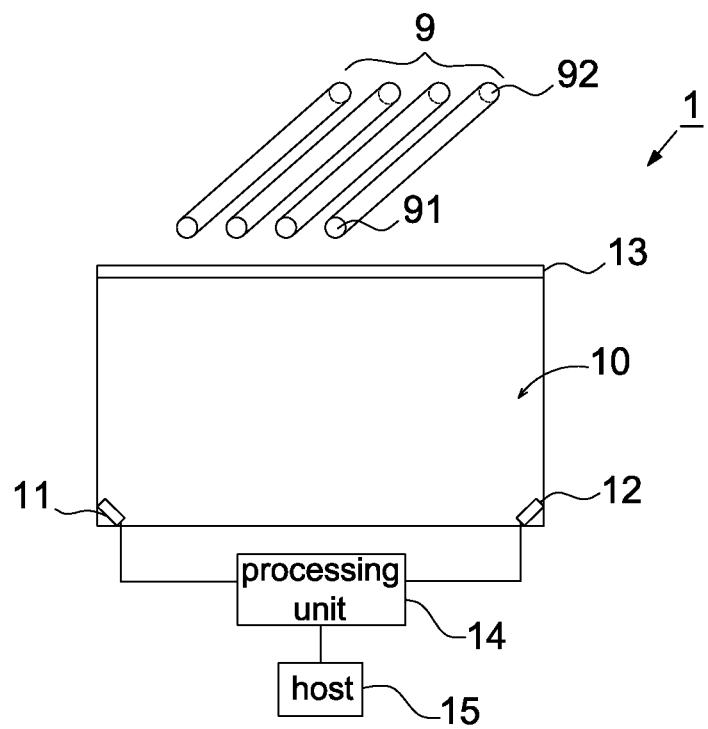
FIG. 1 shows a schematic diagram of the image system according to an embodiment of the present disclosure.
Figure 2:
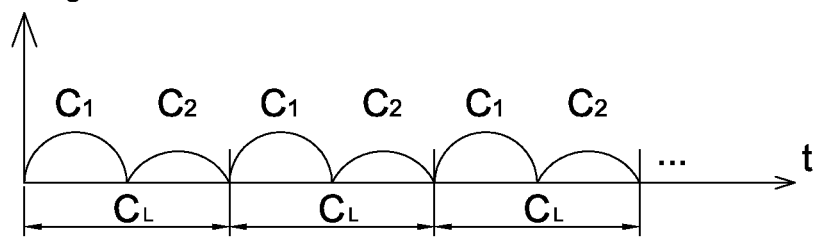
FIG. 2 shows a schematic diagram of the brightness variation of ambient light sources.

Please refer to FIGS. 1 and 2, FIG. 1 shows a schematic diagram of the image system 1 according to an embodiment of the present disclosure; and FIG. 2 shows a schematic diagram of the brightness variation with time of ambient light sources. Although the image system 1 is shown as an optical touch system herein, in other embodiments the image system 1 may be any image system that utilizes at least one image sensor to acquire images and accordingly performs the system control and is not limited to that shown in FIG. 1. In addition, the brightness variation of ambient light sources shown in FIG. 2 is only exemplary.

The image system 1 includes a touch surface 10, at least one image sensor (two image sensors 11 and 12 are shown herein), a light source 13 and a processing unit 14. FIG. 1 further shows an ambient light source 9 in order to represent an operation environment of the image system 1. For example, the ambient light source 9 is shown as a set of fluorescent tubes herein, and each of the fluorescent tubes has a first end 91 and a second end 92. The brightness variation with time of the two ends (i.e. the first end 91 and second end 92) of a fluorescent tube may be similar to that shown in FIG. 2, and the reason causing the non-uniform brightness at two ends of a fluorescent tube is the direction of exciting current in the tube. For example, in the half cycle that the AC current flows from the first end 91 to the second end 92, the first end 91 can have a higher brightness and the second end 92 can have a lower brightness; on the contrary, in the half cycle that the AC current flows from the second end 92 to the first end 91, the first end 91 can have a lower brightness and the second end 92 can have a higher brightness. Therefore, the respective brightness variation of the first end 91 and the second end 92 may be different in two half cycles as shown in FIG. 2. Especially, infrared light irradiated by a fluorescent tube can have apparent non-uniform brightness variations due to different directions of exciting current. The ambient light source 9 may have a brightness variation cycle $C_L$ such as (1/60) second or (1/50) second, wherein a value of the brightness variation cycle $C_L$ is determined according to an AC frequency of the power system coupled to the ambient light source 9. In FIG. 2, each of the brightness variation cycles $C_L$ includes a first brightness variation interval $C_1$ and a second brightness variation interval $C_2$, wherein the first brightness variation interval $C_1$ and the second brightness variation interval $C_2$ have different brightness values or different brightness variations but have identical time intervals. It is appreciated that although in FIG. 2 an average brightness value of the first brightness variation intervals $C_1$ is shown to be larger than that of the second brightness variation intervals $C_2$, the present disclosure is not limited thereto. For example, in other embodiments the first brightness variation intervals $C_1$ and the second brightness variation intervals $C_2$ may have irregular brightness variations and different time intervals depending on a combination of ambient light sources.

The touch surface 10 may be made of suitable material. A user may use an object, e.g. his or her finger(s) or other touch device, to approach or contact the touch surface 10 in order to perform various controls on the image system 1, wherein functions that can be performed may be those in conventional touch systems such as the cursor control or the item selection, but not limited thereto. Since functions of a touch system is well known, details thereof will not be described herein. The spirit of the present disclosure is to eliminate the impact on the operation accuracy of an image system from complicated brightness variations of ambient light sources similar to FIG. 2.

The image sensors 11 and 12 may be CCD image sensors, CMOS image sensors or the like. Field of views of the image sensors 11 and 12 preferably encompass at least the touch surface 10 in order to acquire images looking across the touch surface 10 and containing at least one object hovering upon or in contact with the touch surface 10. It should be mentioned that a number of the image sensors are not limited to two, and the disposition of the image sensors is not limited to that shown in FIG. 1.

The light source 13 may be any suitable light source such as a light emitting diode (LED), a reflective stripe or an emitting stripe, but not limited thereto. In addition, the disposition and number of the light source 13 is not limited to that shown in FIG. 1. The light source 13 may be disposed at any suitable location or has an arbitrary number as long as the image sensors 11 and 12 may acquire images of at least one object blocking the light irradiated by the light source 13.

The processing unit 14 receives images acquired by the image sensors 11 and 12 and performs post-processing. For example, the processing unit 14 may calculate a displacement or other operating parameters according to an image variation of the object in the acquired images and correspondingly control the program executed by a host 15, wherein the method that the processing unit 14 calculates various operating parameters according to the images acquired by the image sensors 11 and 12 are well known, e.g. calculating the displacement according to the correlation between images, and thus details thereof will not be described herein.

Figure 3:
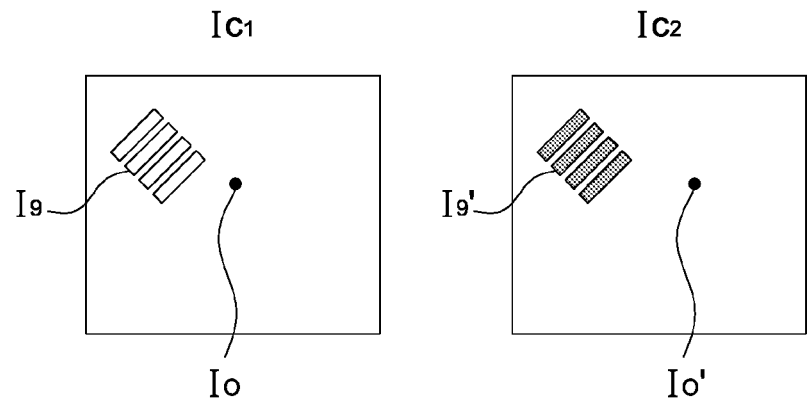
FIG. 3 shows a schematic diagram of the interference from the ambient light source.

Field of views of the image sensors 11 and 12 may be interfered by ambient light sources. For example, an image of the ambient light source 9 may appear in the images acquired by the image sensors 11 and 12 as shown in FIG. 3. For example, the image sensors 11 and 12 may acquire a first image $I_{C1}$ in the first brightness variation interval $C_1$, and acquire a second image $I_{C2}$ in the second brightness variation interval $C_2$ corresponding to a acquisition phase of the first image $I_{C1}$ in the first brightness variation interval $C_1$, wherein the first image $I_{C1}$ contains a first ambient light source image $I_9$ and a first object image $I_O$, and the second image $I_{C2}$ contains a second ambient light source image $I_9'$ and a second object image $I_O'$. If the first brightness variation interval $C_1$ and the second brightness variation interval $C_2$ have identical brightness variations, the processing unit 14 is able to remove the ambient light source images $I_9$ and $I_9'$ by calculating an image difference between the first image $I_{C1}$ and the second image $I_{C2}$ and further to calculate a correct displacement between the object images $I_O$ and $I_O'$. However, if the brightness variation of the ambient light source 9 is similar to that shown in FIG. 2, the processing unit 14 is unable to eliminate the interference from the ambient light source images $I_9$ and $I_9'$ when calculating the displacement or control parameters using the same method, and thus errors can be introduced. Therefore, the present disclosure further provides a denoising method (described later) to effectively reduce or eliminate the impact of the ambient light source 9 on the image system 1.

Figure 4:
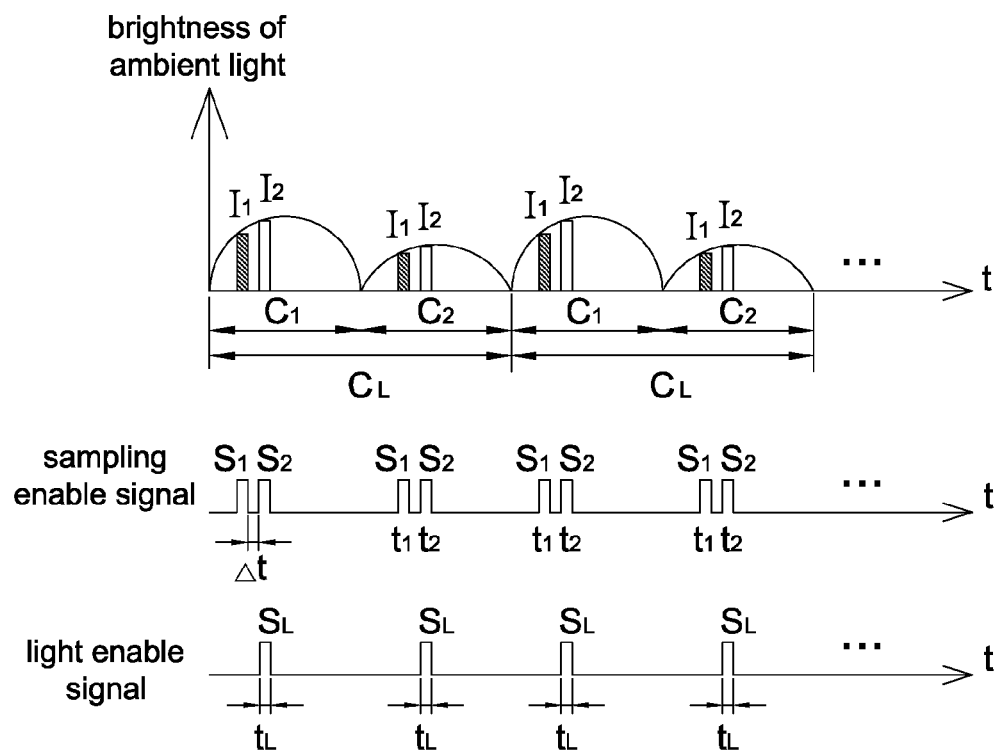
FIG. 4 shows a schematic diagram of the denoising method for an image system according to the first embodiment of the present disclosure.

Please refer to FIG. 4, it shows a schematic diagram of the denoising method for an image system according to an embodiment of the present disclosure, wherein the ambient light source 9 irradiates at a lighting frequency ($1/C_L$) and has a brightness variation cycle $C_L$, the image sensors 11 and 12 successively acquire two images straight at a sampling frequency ($2/C_L$), and the light source 13 also lights at a lighting frequency ($2/C_L$). In this embodiment, sampling enable signals, such as $S_1$ and $S_2$, are sent to the image sensors 11 and 12 simultaneously such that the image sensors 11 and 12 may successively acquire two images $I_1$ and $I_2$ within each of the brightness variation intervals $C_1$ and $C_2$, wherein a time interval At between the images $I_1$ and $I_2$ should be controlled as short as possible. A light enable signal $S_L$ is sent to the light source 13 once within each of the brightness variation intervals $C_1$ and $C_2$ to enable the light source 13, wherein the light enable signal $S_L$ is preferable synchronized to one of the sampling enable signals $S_1$ and $S_2$ (e.g. synchronizing to the sampling enable signal $S_2$ herein). In this manner, the image sensors 11 and 12 are able to respectively acquire a dark image $I_1$ (i.e. the light source 13 is turned off) and a bright image $I_2$ (i.e. the light source 13 is turned on) within each of the brightness variation intervals $C_1$ and $C_2$ of the ambient light source 9. The processing unit 14 then calculates an image difference between the dark image $I_1$ and the bright image $I_2$ so as to eliminate the impact from the ambient light source 9, and to further calculate a displacement between the object images $I_O$ and $I_O'$. In this embodiment, since the time interval At is very short compared to the brightness variation intervals $C_1$ and $C_2$ of the ambient light source 9, a brightness change of the ambient light source 9 between the time interval At is not apparent, and thus the interference caused by the brightness change of the ambient light source 9 can be significantly reduced by calculating the image difference. In addition, an enable interval $t_L$ of the light enable signals $S_L$ may be larger than, equal to or smaller than an enable interval $t_2$ (i.e. an exposure time) of the sampling enable signals $S_2$.

Figure 5:
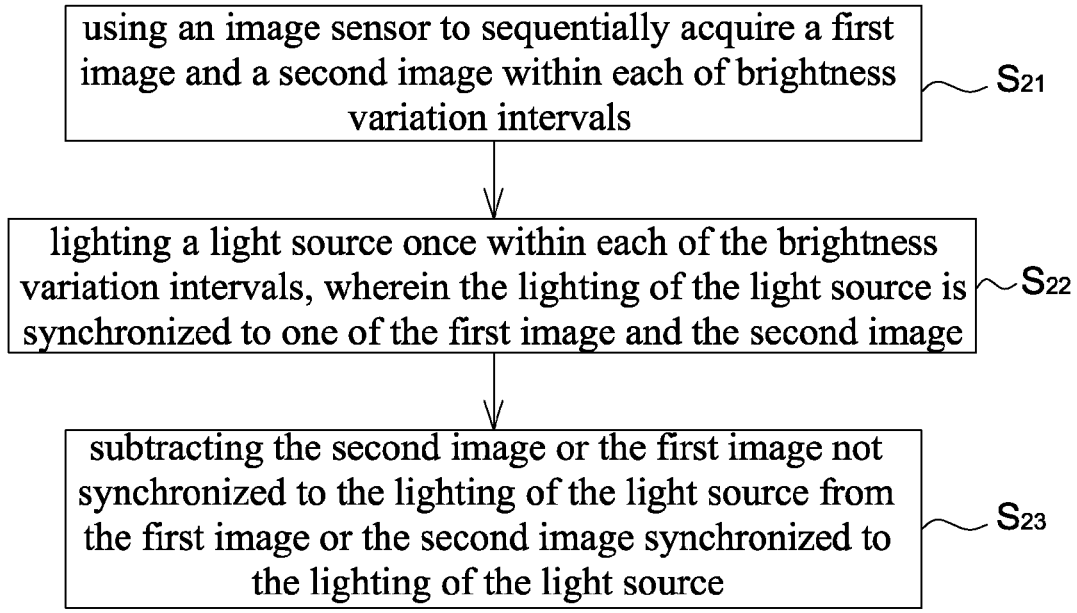
FIG. 5 shows a flow chart of the denoising method for an image system according to the first embodiment of the present disclosure.

Please refer to FIG. 5, it shows a flow chart of the denoising method for an image system according to the first embodiment of the present disclosure including the steps of: using an image sensor to sequentially acquire a first image and a second image within each of the brightness variation intervals (Step $S_{21}$); lighting a light source once within each of the brightness variation intervals, wherein the lighting of the light source is synchronized to one of the first image and the second image (Step $S_{22}$); and subtracting the second image or the first image which is not synchronized to the lighting of the light source from the first image or the second image which is synchronized to the lighting of the light source thereby eliminating interference from the ambient light (Step $S_{23}$); wherein details of every step of this embodiment has been illustrated in FIG. 4 and its corresponding descriptions and thus will not be repeated again.

Figure 6:
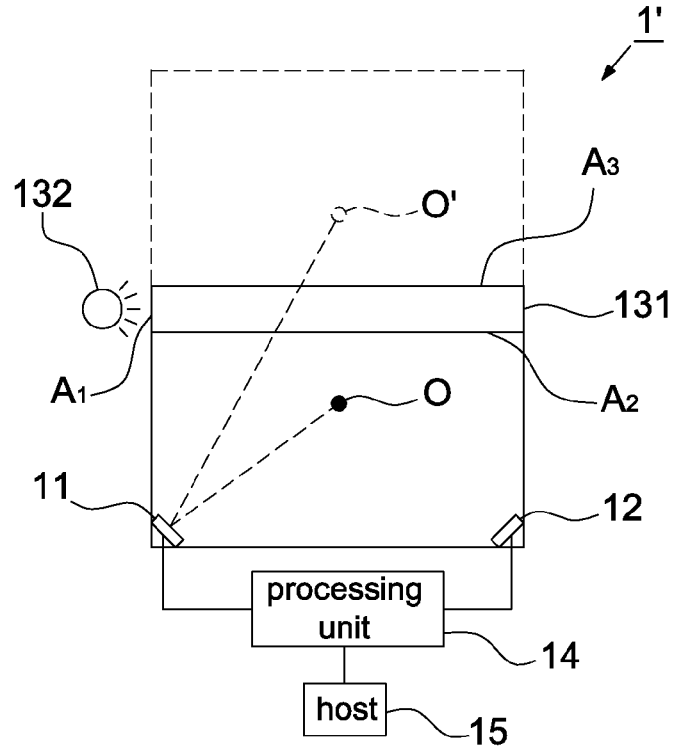
FIG. 6 shows another schematic diagram of the image system according to the embodiment of the present disclosure.

Please refer to FIG. 6, it shows another schematic diagram of the image system 1' according to the embodiment of the present disclosure. The main difference between FIG. 6 and FIG. 1 is that the light source 13 in FIG. 6 is composed of a light guide 131 and a point light source 132, wherein the light guide 131 is configured to convert the point light source 132 into a linear light source. The light guide 131 includes an injection surface A1, an ejection surface A2 and a reflection surface A3, wherein light irradiated by the point light source 132 enters the light guide 131 via the injection surface A1 and irradiates from the light guide 131 via the ejection surface A2, and thus the ejection surface A2 preferably faces the touch surface 10. The reflection surface A3 is preferably a mirror surface such that an object O in the range of the touch surface 10 may correspondingly generate an object mirror image O' with respect to the reflection surface A3. In the image system 1', when the point light source 132 is turned on, the image sensors 11 and 12 may acquire an object image of the object O blocking the light guide 131; when the point light source 132 is turned off, the image sensors 11 and 12 may acquire object images of the object O and the object mirror image O'.

Please refer to FIGS. 4 and 6 together, as the object mirror image O' has a relatively longer distance from the image sensors 11 and 12, the object image of the object mirror image O' acquired by the image sensors 11 and 12 has a lower brightness value, and thus an enable interval $t_1$ (i.e. a first exposure time) of the sampling enable signal $S_1$ may be longer than an enable interval $t_2$ (i.e. a second exposure time) of the sampling enable signal $S_2$ such that the object images in the two images $I_1$ and $I_2$ may have substantially identical brightness values. In other words, in the first embodiment the enable intervals $t_1$ and $t_2$ (i.e. the exposure times) may be identical or different according to different applications.

Please refer to FIG. 7, it shows a schematic diagram of the denoising method for an image system according to the second embodiment of the present disclosure, wherein the ambient light source 9 irradiates at a lighting frequency ($1/C_L$) and has a brightness variation cycle $C_L$, the image sensors 11 and 12 successively acquire an odd number of at least three images straight (e.g. 3, 5, 7, . . . images) at a sampling frequency ($2/C_L$), and the light source 13 also lights at a lighting frequency ($2/C_L$). In this embodiment, an odd number of at least three sampling enable signals, such as $S_1$ to $S_3$, are sent to the image sensors 11 and 12 simultaneously such that the image sensors 11 and 12 may sequentially acquire three images $I_1$ to $I_3$ within each of the brightness variation intervals $C_1$ and $C_2$, wherein a time interval At between the images $I_1$ and $I_2$ and between the images $I_2$ and $I_3$ does not have particular limitation as long as the odd number of at least three images $I_1$ to $I_3$ can be acquired within one brightness variation interval. A light enable signal $S_L$ is sent to the light source 13 once within each of the brightness variation intervals $C_1$ and $C_2$ to enable the light source 13, wherein the light enable signal $S_L$ is preferable synchronized to a middle sampling enable signal (e.g. $S_2$ herein) of the sampling enable signals $S_1$ to $S_3$. In this manner, the image sensors 11 and 12 are able to respectively acquire a bright image $I_2$ and an even number of dark images, e.g. $I_1$ and $I_3$ herein, within each of the brightness variation intervals $C_1$ and $C_2$ of the ambient light source 9, wherein an acquisition time of the dark image $I_1$ is previous to that of the bright image $I_2$, and an acquisition time of the dark image $I_3$ is later than that of the bright image $I_2$. The processing unit 14 calculates an image difference between the bright image $I_2$ and a sum or an average of the dark images, e.g. $I_1$ and $I_3$ herein, so as to eliminate the impact from the ambient light source 9, and to further calculate a displacement between the object images. In addition, if the image sensors 11 and 12 acquire five or more than five images within one brightness variation intervals, the dark images are preferably averagely acquired before and after one bright image.

In this embodiment, in order to effectively eliminate interference from the ambient light source 9, enable intervals $t_1$ to $t_3$ of the sampling enable signals $S_1$ to $S_3$ (i.e. exposure times) may be designed in several ways.

In one embodiment, in order to simplify the sampling enable signals, the enable intervals $t_1$ to $t_3$ (i.e. exposure times) may be identical. Therefore, the processing unit 14 may first divide a sum of the dark images $I_1$ and $I_3$ (i.e. a sum of gray levels of corresponding pixels of the dark images $I_1$ and $I_3$) by 2 and then subtracts the processed dark image from the bright image when calculating the image difference between the bright image and the dark images, i.e. $I_2-(I_1+I_3)/2$; therefore, the interference from the ambient light source 9 can then be eliminated. In other embodiments, when more dark images are acquired, e.g. 4, 6, . . . dark images, the processing unit 14 may first divide a sum of all the dark images (i.e. gray levels of corresponding pixels of all the dark images) by an image number of the dark images (i.e. calculating an average of all the dark images) and then subtracts the averaged dark image from the bright image when calculating the image difference between the bright image and the dark images; therefore, the interference from the ambient light source 9 can then be eliminated.

In another embodiment, the enable intervals $t_1$ to $t_3$ (i.e. exposure times) may be different and satisfy a condition $(t_1+t_3)=t_2$, e.g. $t_1=t_3=t_2/2$, but not limited thereto. In this manner, as long as a sum of the enable intervals of all the dark images is equal to an enable interval of the bright image, the processing unit 14 still can eliminate the interference from the ambient light source 9 by calculating the image difference between the bright image and a sum of all the dark images, wherein said sum of all the dark images referred herein is a sum of gray values of pixels at corresponding positions in all dark images. In addition, an enable interval $t_L$ of the light enable signals $S_L$ may also be larger than, equal to or smaller than an enable interval $t_2$ (i.e. an exposure time) of the sampling enable signals $S_2$.

Please refer to FIG. 8, it shows a flow chart of the denoising method for an image system according to the second embodiment of the present disclosure including the steps of: using an image sensor to sequentially acquire an odd number of at least three images within each of the brightness variation intervals (Step $S_{31}$); lighting a light source once within each of the brightness variation intervals, wherein the lighting of the light source is synchronized to a middle image of the odd number of images (Step $S_{32}$); and subtracting a sum or an average of the other images which are not synchronized to the lighting of the light source from the middle image which is synchronized to the lighting of the light source thereby eliminating interference from the ambient light source (Step $S_{33}$), wherein details of every step of this embodiment has been illustrated in FIG. 7 and its corresponding descriptions and thus will not be repeated again.

In addition, the denoising method of the first and second embodiments of the present disclosure may also be applied to the operation under an ambient light having a fixed brightness variation. That is, when the brightness variation of ambient light sources is fixed, the brightness variations of two brightness variation intervals in one brightness variation cycle are identical. In other words, the denoising method of every embodiment of the present disclosure may be configured to effectively reduce the interference from various ambient light sources and is not limited to the example used in the embodiments of the present disclosure.

As mentioned above, conventional image systems are not able to entirely eliminate the impact caused by ambient light sources, especially when the ambient light sources have complicated brightness variations. Therefore, the present disclosure further provides an image system (FIGS. 1 and 6) and denoising method therefor (FIGS. 5 and 8) that may effectively eliminate the flicker caused by ambient light sources having brightness variation intervals with different brightness variations thereby increasing the system accuracy during operation.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A denoising method for an image system, the image system comprising at least one image sensor and a light source and operating under an ambient light, which has a brightness value varying with brightness variation intervals, the denoising method comprising the steps of:
    using the image sensor to sequentially acquire an odd number of at least three images within each of the brightness variation intervals;
    lighting the light source once within each of the brightness variation intervals, wherein the lighting of the light source is synchronized to a middle image of the odd number of at least three images; and
    subtracting a sum or an average of the other images not synchronized to the lighting of the light source from the middle image synchronized to the lighting of the light source thereby eliminating interference from the ambient light.

2. The denoising method as claimed in claim 1, wherein the image sensor acquires the odd number of at least three images with identical enable intervals, and the average of the other images is a sum of gray values of corresponding pixels of the images not synchronized to the lighting of the light source divided by an image number of the other images.

3. The denoising method as claimed in claim 1, wherein the image sensor acquires the odd number of at least three images with different enable intervals; the enable interval associated with the middle image is equal to a sum of the enable intervals associated with the other images; and the sum of the other images is a sum of gray values of corresponding pixels of the images not synchronized to the lighting of the light source.

4. An image system, configured to operate under an ambient light, which has a brightness value varying with brightness variation intervals, the image system comprising:

at least one image sensor configured to sequentially acquire a first image, a second image and a third image within each of the brightness variation intervals;

a light source configured to light once within each of the brightness variation intervals, wherein the lighting of the light source is synchronized to the second image; and a processing unit configured to subtract an average of the first image and the third image from the second image when the image sensor acquires the first image, the second image and the third image with identical enable intervals, or subtract a sum of the first image and the third image from the second image when the image sensor acquires the first image with a first enable interval, acquires the second image with a second enable interval and acquires the third image with a third enable interval, wherein the second enable interval is equal to a sum of the first enable interval and the second enable interval.

5. The image system as claimed in claim 4, wherein each of the brightness variation intervals is (1/100) second or (1/120) second.

6. An image system, comprising:

a light source being turned on at a predetermined frequency;

an image sensor configured to sequentially acquire a first image when the light source is turned off, a second image when the light source is turned on and a third image when the light source is turned off again; and a processing unit configured to subtract a sum or an average of the first image and the third image from the second image.

7. The image system as claimed in claim 6, wherein the predetermined frequency is 100 Hz or 120 Hz.

8. The image system as claimed in claim 6, wherein the image sensor acquires the first image with a first exposure time, acquires the second image with a second exposure time and acquires the third image with a third exposure time; the first exposure time, the second exposure time and the third exposure time are identical; and the processing unit subtracts the average of the first image and the third image from the second image.

9. The image system as claimed in claim 6, wherein the image sensor acquires the first image with a first exposure time, acquires the second image with a second exposure time and acquires the third image with a third exposure time; a sum of the first exposure time and the third exposure time is identical to the second exposure time; and the processing unit subtracts the sum of the first image and the third image from the second image.

10. An image system, comprising:

a light source configured to be turned on at a predetermined frequency;

an image sensor configured to acquire a first image with a first exposure time when the light source is turned off and to acquire a second image with a second exposure time when the light source is turned on, wherein the first exposure time is different from the second exposure time; and a processing unit configured to obtain an object information according to the first image and the second image, wherein the object information is an image information of an object in contact with or hovering upon a touch surface.

11. The image system as claimed in claim 10, wherein the image sensor sequentially acquires the first image with the first exposure time when the light source is turned off, acquires the second image with the second exposure time when the light source is turned on and acquires another first image with the first exposure time when the light source is turned off; and the processing unit obtains the object information according the two first images and the second image.

12. The image system as claimed in claim 10, wherein the image sensor sequentially acquires the first image with the first exposure time when the light source is turned off, acquires the second image with the second exposure time when the light source is turned on and acquires a third image with a third exposure time when the light source is turned off; the processing unit obtains the object information according to the first image, the second image and the third image; and the first exposure time, the second exposure time and the third exposure time are different.

13. The image system as claimed in claim 12, wherein a sum of the first exposure time and the third exposure time is equal to the second exposure time.

* * * * *